June 30, 1925.

H. W. MAY ET AL 1,544,254

GAME

Filed Aug. 25, 1924

INVENTORS:
Horace W. May
Bradford A. Mathewson
BY
ATTORNEY

Patented June 30, 1925.

1,544,254

UNITED STATES PATENT OFFICE.

HORACE W. MAY AND BRADFORD A. MATHEWSON, OF OROSI, CALIFORNIA, ASSIGNORS OF ONE-FOURTH TO WILLIAM R. LITZENBERG, OF LOS ANGELES, CALIFORNIA.

GAME.

Application filed August 25, 1924. Serial No. 733,958.

*To all whom it may concern:*

Be it known that we, HORACE W. MAY and BRADFORD A. MATHEWSON, citizens of the United States, residing in Orosi, Tulare County, California, have invented a certain new and useful Game, of which the following is a specification.

Our invention relates to games, and it has for its principal object to provide a game which represents a world flight, that is, a game in which the players represent the flyers who are making a flight around the world, and in which their advance from place to place is controlled by many of the conditions and experiences which flyers have who actually fly on such a trip. For example, the flyers who are making the present world flight, wait for "Fair weather" in order to make a start, so in our game, the player, who represents one of the flyers, must secure the indication "Fair weather" before he can start, which designation may also indicate the number of stations which he covers on the first flight. These conditions and experiences are established by a device involving the element of chance, as in the spinning of a whirling arrow or propeller, which stops in any one of many positions, which positions designate the different conditions or the advance made by the player. Such conditions and experiences as "Out of gas"; "Pontoons"; "Wreck: out of game"; "Engine trouble"; "Storm"; "London fog", etc. The game, in addition to being an amusement device for young and old, is of educational value, both as to the geography of the world, and to experiences sure to be met by those who undertake such a flight around the world because of climatic conditions, distances which must be over water, or over mountains, and the like.

In order to further explain our invention, we have illustrated one practical embodiment thereof on the accompanying sheet of drawings, which we will now describe.

Figure 1:
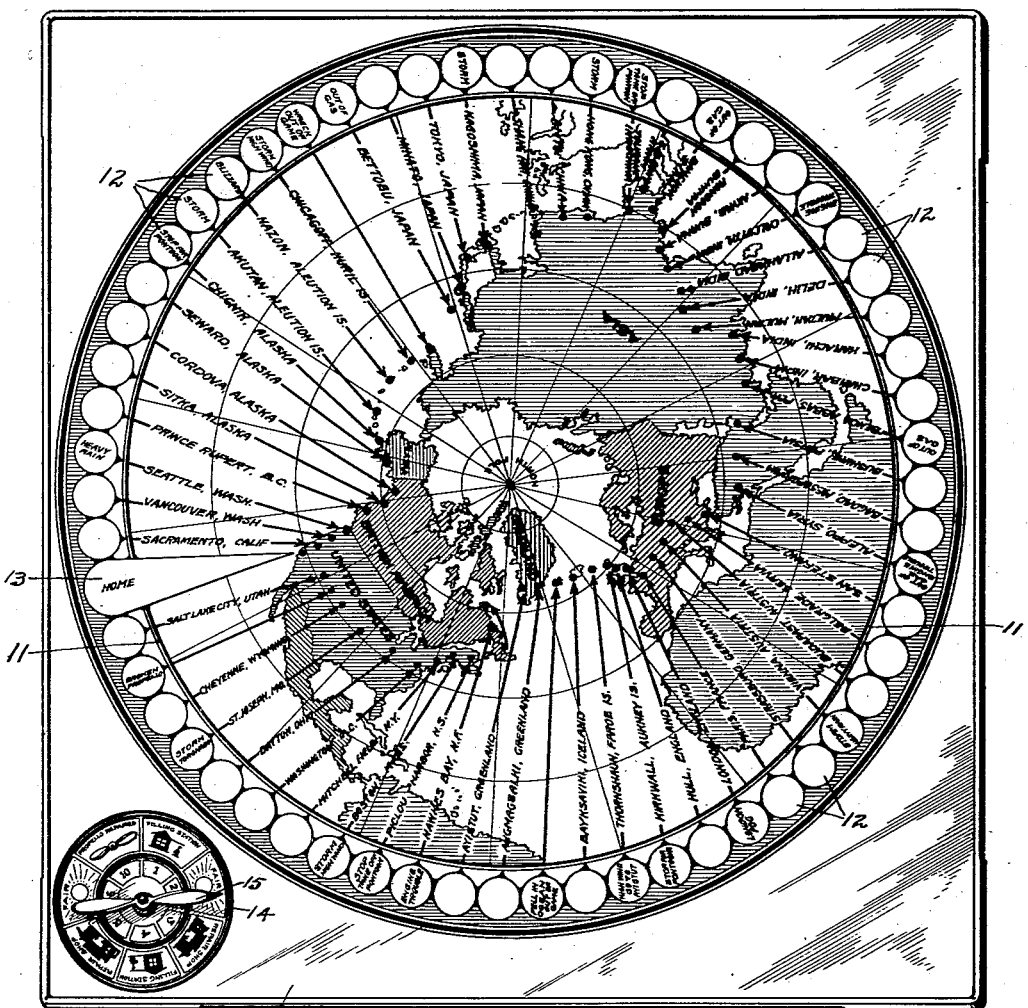
Figure 2:
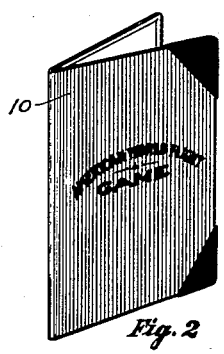
Figure 3:
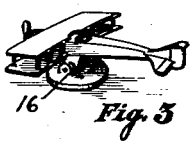

In the drawings, Figure 1 is a plan view of a game board, embodying our invention, and showing a map of the northern hemisphere on which are indicated the stations or stopping places, also showing a form of whirling propeller for indicating each player's next move or condition;

Figure 2 is a perspective view of the game board, showing it partially folded; and Figure 3 is a perspective view of a piece, being the representation of each player's plane and with which he advances in his flight.

We will now describe more in detail one practical embodiment of our invention as illustrated on the accompanying sheet of drawings. The game board may be of any desired size and form. We have illustrated it in Fig. 2, as foldable, with the title on the outside and with the map on the inner face, the board being shown open in Fig. 1. The board which carries the map is designated 10, the map of the northern hemisphere is within the circle designated 11, and around the outside of this circle, are small circles representing steps or distances of advance, said circles being designated 12, and some of them also designating certain conditions, happenings, or experiences which the players have when their advance brings them to such space, as indicated on the space itself. From each of these circles around the margin of the map runs a leader line to the place on the map represented by that particular circle. The starting place can be any desired station. We have designated the "Home" or starting station at Los Angeles, and have designated it at 13, with a leader line running to Los Angeles on the map of the United States, as will be seen by the tapered form pointing to Los Angeles.

An indicating device can be provided, such as is shown on one corner of the board, designated 14, on which is a spinning arrow, or propeller, 15, and around the margin of which device is indicated different conditions, such as "Fair" in two places, "Filling station" in two places, "Repair shop" in two places, and "Propeller repaired" in one place. These are designated clearly in the spaces. There is also arranged on the inner circle, spaces bearing different numbers, which are to indicate the number of spaces the player advances in addition to getting what the stop or station indicates.

In Fig. 3, we have illustrated a miniature plane on a base, designated 16, to be used, one by each player, to place on the space marking his advance.

The game can be played by two or four, or even by any other number of persons, as may be desired, just so there are not too many planes on the board and too long periods between the plays of each player.

The players start by spinning the propeller for starting and it can be provided that they must stop at "Fair" before they are off on their flight. If the inner space also indicates 2, they make two spaces from the "Home" or starting place, on which each player places his plane before he spins the propeller. When a player lands on a space indicating one of the misfortunes, or accidents, he must be governed by what is there indicated. If he falls into the ocean, or has a wreck, he is out of the game and removes his plane. If he is out of gas, he remains at that "Out of gas" space until he spins a "Service station." If in a "Storm" he remains until he spins "Fair" and the number indicates how far out he gets from the "Storm" space. It will be clear that many different rules can be made by the players to control their plays, or their advance, as may be desired. The object of the game is, of course, for each player to make a successful flight around the world, visiting each of the stop stations. Some players will move faster than others and some will meet with accident and not complete the flight at all.

We are aware that many changes in the details of the game can be made without departing from the spirit thereof and we do not limit our invention to the exact showing made, except as we may be limited by the hereto appended claims.

We claim:

1. A game including in combination a map of a portion of the world, a series of spaces connected with geographical locations on said map, some of said spaces having thereon indicia as to conditions and needs of the player stopping at that place, a device to be manipulated by the players and having indicia thereon to determine how said conditions and needs are met, said device involving the element of chance, and a play element to be moved from one space to another according to the manipulation of said device.

2. A game including a map of the northern hemisphere, a series of spaces around said map with connecting lines to different geographical locations on said map, said spaces having indicated thereon conditions and needs of the player stopping thereat, a spinning device having indicia thereon for indicating the advance and the meeting of the condition and need, said device involving the element of chance and adapted to be manipulated by each player to determine his advance in the course of travel and how his condition and need are met, substantially as described.

3. A game including a map of the northern hemisphere, a series of spaces around said map, with connecting lines to geographical locations on said map, some of said spaces having thereon indicia indicating happenings, conditions and needs of the players stopping thereat, a spinning device having thereon solutions for said happenings, conditions and needs to determine a players advance, said spinning device involving the element of chance, and a play element adapted to said spaces to be moved thereon.

Signed at Los Angeles, Los Angeles County, California, this 19th day of August, 1924.

HORACE W. MAY.
BRADFORD A. MATHEWSON.

Witnesses:
W. R. LITZENBERG,
IRMA E. COMSTOCK.